Patented Apr. 5, 1927.

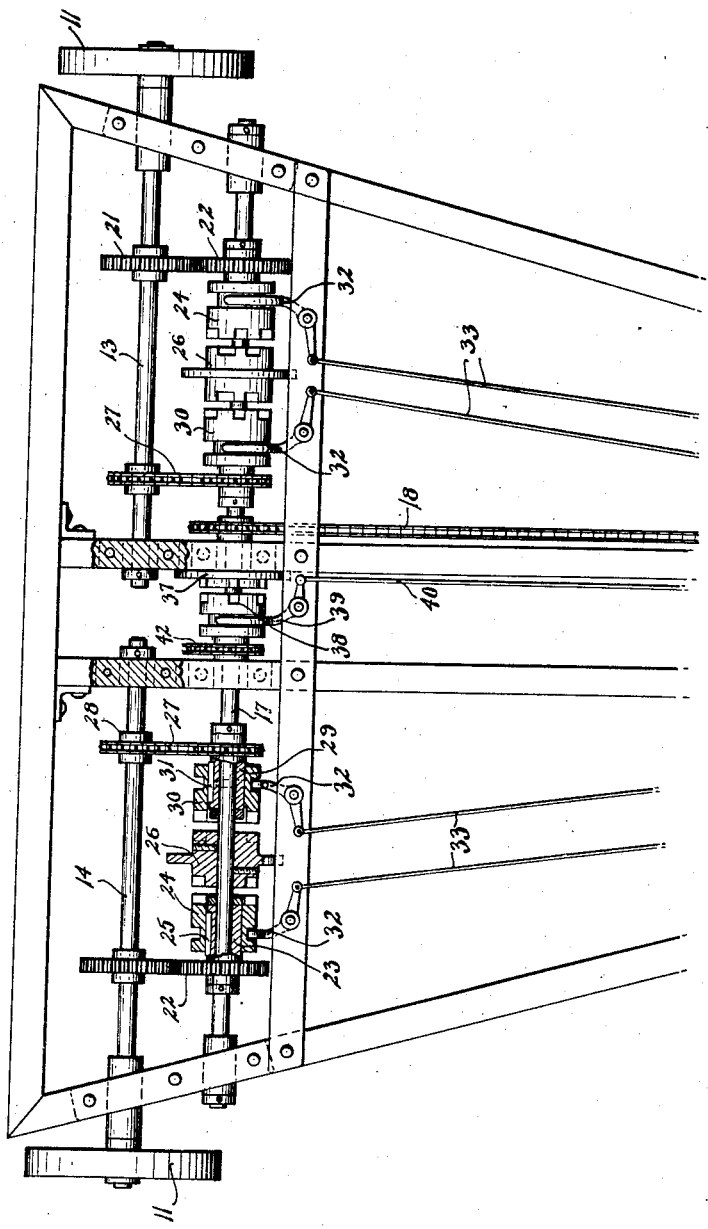

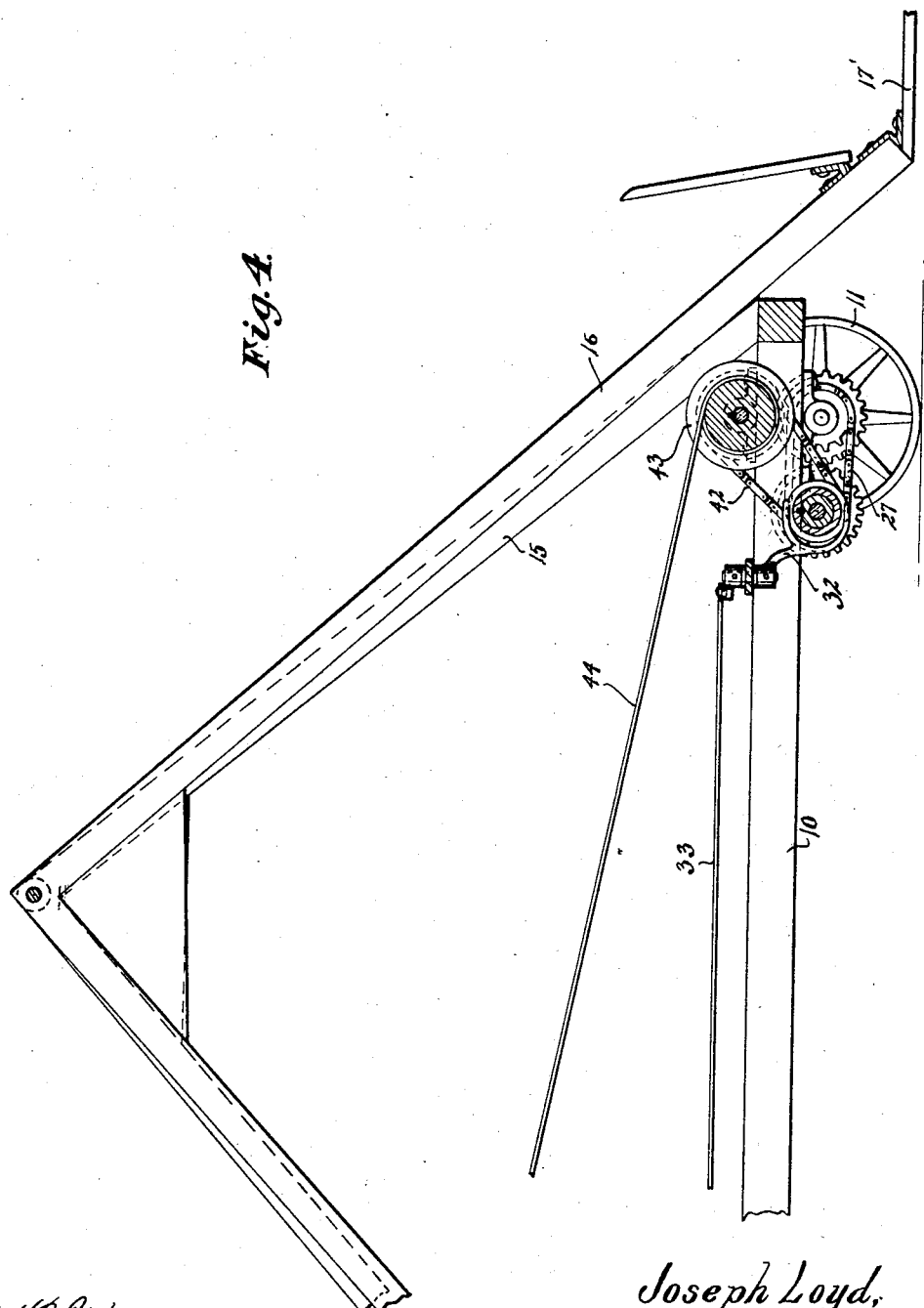

1,623,929

UNITED STATES PATENT OFFICE.

JOSEPH LOYD, OF BROKEN BOW, NEBRASKA.

STEERING BY DRIVING MEANS FOR VEHICLES.

Application filed November 12, 1924. Serial No. 749,537.

This invention contemplates the provision of means for steering a machine through the instrumentality of a plurality of clutches and pedals, by means of which the front wheels of the machine can be rotated in the same or reverse directions as the occasion may require.

Another object of the invention resides in the provision of means for propelling and steering a machine wherein the axles for the ground engaging wheels are capable of being rotated in the same or opposite directions, the invention being primarily intended for use in conjunction with a hay stacker, wherein a rack can also be raised or lowered by a foot controlled clutch mechanism.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is a fragmentary plan view showing the clutch arranged for rotating the axles in the manner above specified.

Figure 4 is a sectional view taken on the line 4—4 of Figure 1.

Figure 1:
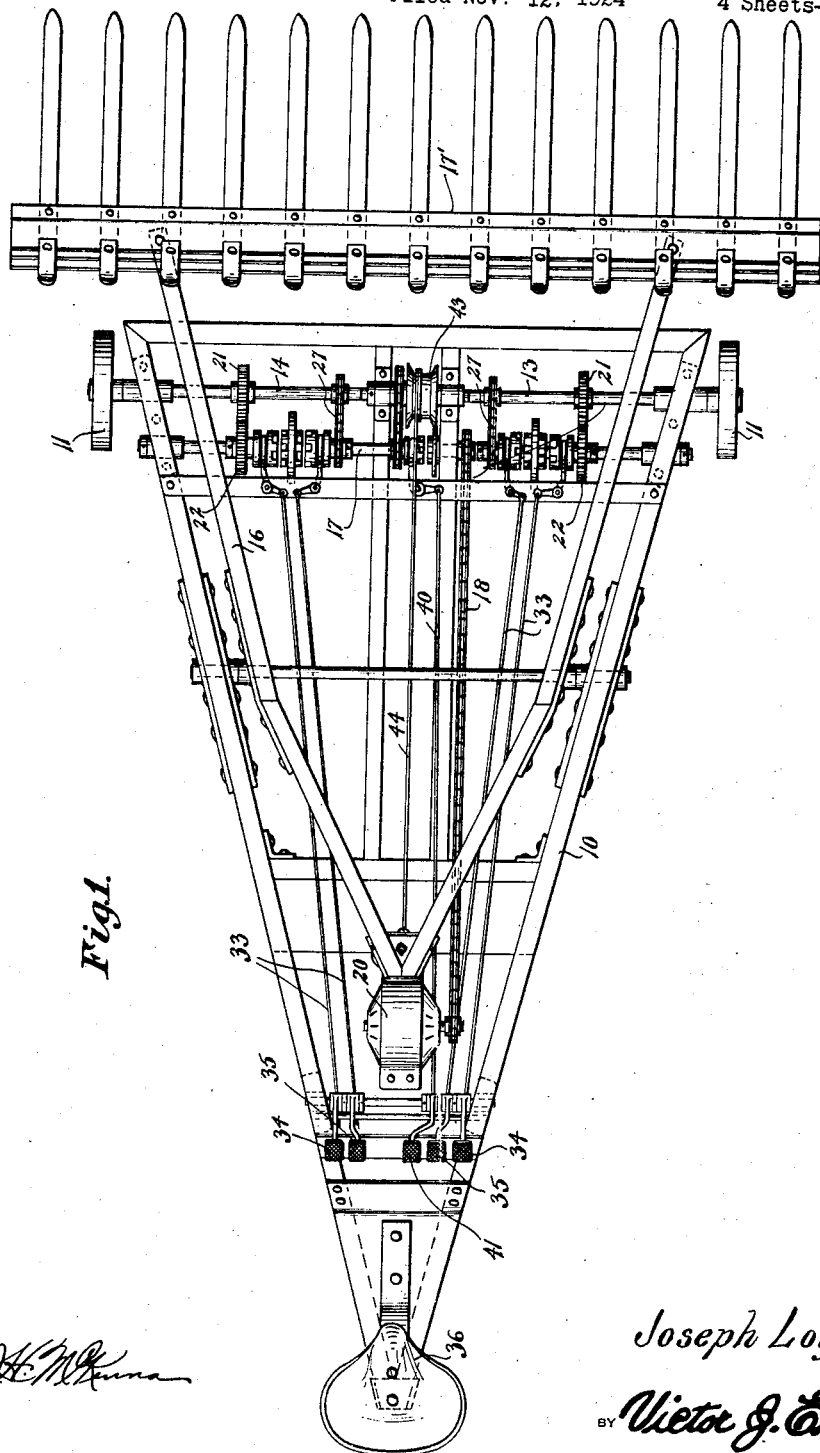
Figure 1 is a top plan view of a hay stacker embodying the subject matter of the present invention.
Figure 2:
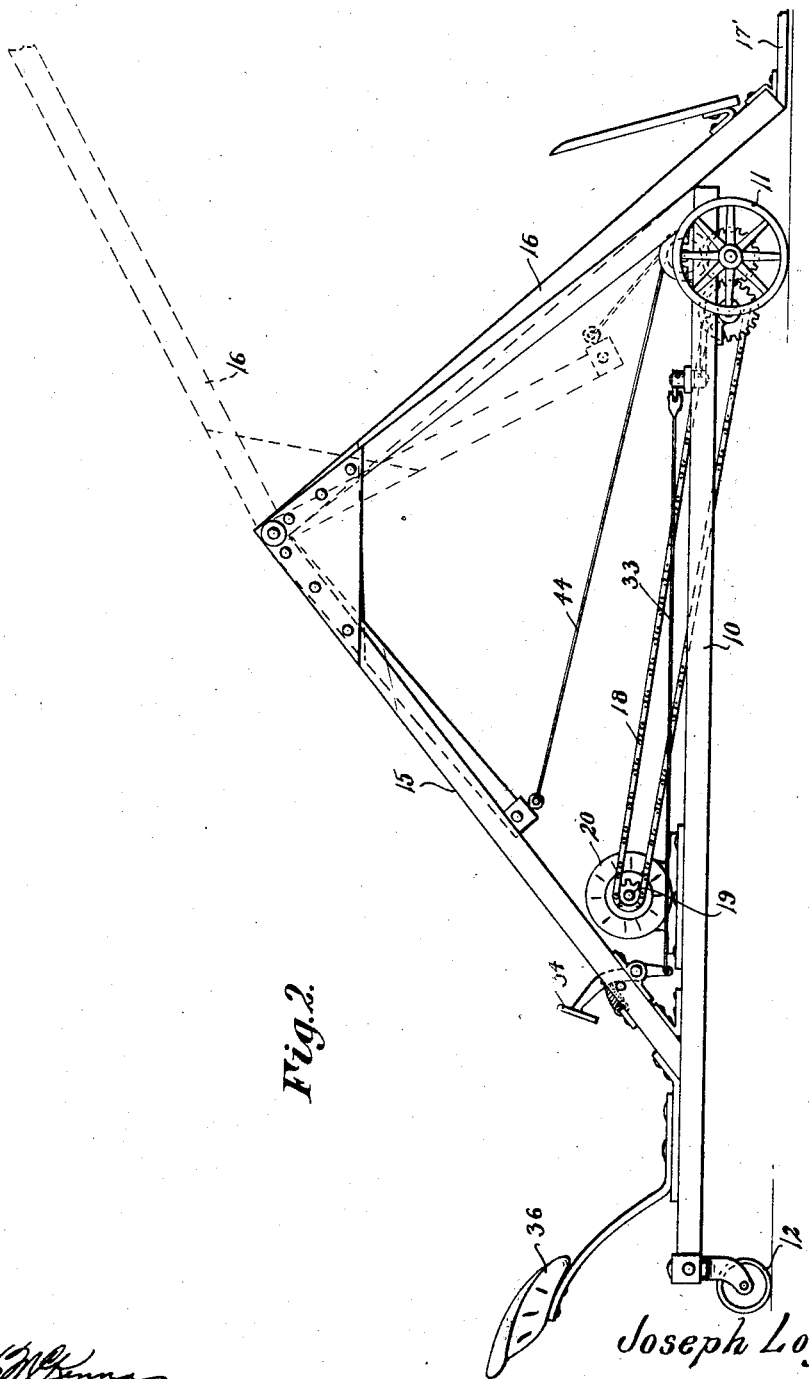
Figure 2 is a side elevation showing the elevated position of the hay fork by dotted lines.

Referring to the drawing in detail, 10 represents the frame of a hay stacker, the frame being mounted on wheels 11 which are arranged at the front thereof, and on a caster or the like 12 which is arranged at the rear end of the frame, the latter being of substantially triangular formation in plan as shown in Figure 1. Each wheel 11 is provided with an axle, and these axles are indicated at 13 and 14 respectively, being journalled in suitable bearings as clearly illustrated in Figure 3. Mounted on the main frame 10 and rising therefrom is an auxiliary frame 15 which is substantially of inverted V-shaped formation, and pivoted on this auxiliary frame is a movable frame 16 of similar contour, which movable frame carries the hay fork indicated generally at 17'. The fork carrying frame 16 is of course pivoted on the frame 15 at the apex thereof, so that the fork 17' can either occupy its normal position shown by full lines in Figure 2, or be elevated to the position illustrated by the dotted line position of the movable frame 16 shown in Figure 3. Journalled on the main frame 10 directly behind and parallel with the axles above referred to is a driven shaft 17, this shaft being driven by an endless chain 18 which is trained over a sprocket carried by the shaft 17, and a similar sprocket carried by a motor shaft 19, the motor being indicated generally at 20. The shaft 17 drives the axles 13 and 14 respectively, a series of clutches being employed for this purpose, and arranged to be selectively used, to rotate both axles simultaneously in either a forward or rearward direction, or to rotate said axles relatively in opposite directions.

Upon inspection of Figure 3, it will be noted that each of the axles is provided with a gear 21 which meshes with a similar gear 22 fixed upon the shaft 17. Each gear 22 is carried by a sleeve 23, and slidably mounted on each sleeve is a clutch member 24 which is also connected with the sleeve by means of a key 25. Each clutch member 24 is normally spaced from a cooperating clutch member 26 which is fixed to the shaft 17. Each axle is also connected with the shaft 17 by means of sprockets and an endless chain, the latter being indicated at 27, and trained over a sprocket 28 fixed on the adjacent axle and a similar sprocket carried by a sleeve 29 which is fixed on the shaft 17. Arranged to slide on this sleeve 29 is a clutch member 30 which is also keyed to the sleeve as at 31, the clutch member 30 being normally spaced from the clutch member 26 above referred to. Manifestly, the axles 13 and 14 can be driven from the shaft 17 either through the gears 21 and 22 or by the chain 27, this depending upon which of the movable clutch members 24 and 26 respectively are moved into operative association with the clutch member 26. As shown in Figure 3, each sliding clutch member has associated therewith a pivoted arm 32 which is connected with the adjacent end of a rod 33, and each rod in turn is connected with a foot pedal as shown in Figure 1. Consequently, there is a pair of foot pedals 34 and 35 respectively for the clutch members 24 and 30, and each side of the frame, and adjacent the driver's seat indicated at 36. These pedals are used selectively to rotate the axles 13 and 14 in the desired direction. For instance, when it is desired to rotate the axles 13 and 14 in a forward direction, the pedals 34 at the opposite sides of the machine are depressed, thereby moving the corresponding clutch members 24 into operative association with the adjacent clutch member 26, whereupon the gears 21 and 22 are employed to rotate the axles 13 and 14 in a forward direction. If it is desired to reverse the machine, the pedals 35 are depressed, thus throwing the corresponding clutch members 30 for the respective axles into operative association with the adjacent clutch member 26. Under these circumstances the axles 13 and 14 are rotated in a reverse direction through the instrumentality of the endless chains 27. When the clutch members are used in the manner just described, the clutches are used for propelling the machine in either a forward or rearward direction, which by reason of the construction and arrangement of parts, it is manifest that the clutches can also be used for steering the machine. In other words, the axles 13 and 14 are rotated in relatively opposite directions to allow the machine to make a short turn either to the right or to the left, and this is accomplished by using one of the clutch members 24 with the adjacent clutch member 26, and one of the clutch members 30 with its adjacent clutch member 26 at one and the same time. By depressing the pedal 34 at the right hand side of the machine, the axle 13 is rotated in a forward direction through the gears 21 and 22, while simultaneously depressing the clutch pedal 35 at the other side of the machine, will rotate the axle 14 in an opposite direction through the chain drive 27.

In addition to the clutches above described, the shaft 17 is also provided with a clutch member 37 arranged centrally on said shaft, while cooperating with this clutch 37 is a normally spaced sliding clutch member 38. The clutch member 38 has associated therewith a pivoted arm 39 which is connected with the adjacent end of the rod 40, the rod being actuated by means of a foot pedal 41 disposed adjacent one pair of pedals above referred to. When this pedal 41 is depressed, the clutch member 38 is moved into operative association with the clutch member 37, whereupon both clutch members rotate in unison. The clutch member 38 is employed to drive an endless chain 42, which is trained over a sprocket carried by the hub of a drum 43 which has connected therewith a flexible element 44 employed to raise or lower the fork carrying frame 16. In other words, the flexible element 44 is adapted to be wound about and unwound from the drum 43, and when the clutch member 38 is moved into operative association with the clutch member 37, the drum is rotated in a direction to wind the flexible element 44 thereabout thus exerting a pull upon the movable frame 16 to elevate the fork in the manner indicated; dotted line position of the frame in Figure 2. While the means for propelling and steering the machine is shown in connection with a hay stacking machine, I desire to have it understood that the invention can be used in connection with other types of machines, and that its general application is contemplated by the claim.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

In combination, a wheeled frame, a pair of aligned axles journaled thereon, a driven shaft arranged at one side and in parallelism with the axles, a gear carried by each axle, a central clutch member mounted on the shaft for each axle, a pair of cooperating clutch members slidably mounted on the shaft and arranged at the opposite sides of the central clutch member, an endless chain providing a driving connection between one of the cooperating clutch members and the adjacent axle, a gear carried by the other cooperating clutch member of each pair and meshing with the gear of the adjacent axle, pivoted arms associated with the cooperating clutch members, operating rods connected with the said arms, foot pedals associated with said rods, whereby said cooperating clutch members can be selectively actuated to rotate said axles in the same direction or in relatively different directions, an additional clutch member arranged centrally of the shaft, a cooperating sliding clutch member normally spaced from the last mentioned member, and pedal actuated means for controlling the sliding clutch member.

In testimony whereof I affix my signature.

JOSEPH LOYD.